United States Patent
Panigati

[15] 3,673,856
[45] July 4, 1972

[54] FLUID OPERATED SENSOR

[72] Inventor: Pier L. Panigati, Via Friuli 64, Milan, Italy

[22] Filed: March 26, 1970

[21] Appl. No.: 22,953

[30] Foreign Application Priority Data

Jan. 20, 1970 Italy..................................19582 A/70

[52] U.S. Cl. ............................................................73/37.5
[51] Int. Cl. ..........................................................G01b 13/12
[58] Field of Search........................................73/37.5–37.7; 33/DIG. 2; 239/463

[56] References Cited

UNITED STATES PATENTS

| | | | |
|---|---|---|---|
| 3,481,180 | 12/1969 | Jones | 73/37.5 |
| 3,545,256 | 12/1970 | Beeken | 73/37.5 |
| 3,371,517 | 3/1968 | Roth | 73/37.5 |
| 2,692,498 | 10/1954 | Knobel | 73/37.5 |

Primary Examiner—Louis R. Prince
Assistant Examiner—William A. Henry, II
Attorney—Auzville Jackson, Jr.

[57] ABSTRACT

Fluid operated sensor comprising a pipe member having one end open and an opposite end connected to a fluid operated control circuit. An annular nozzle surrounds at least a portion of the pipe member and has an annular orifice surrounding the open end of the pipe member. A pressure fluid input duct connected with a source of pressurized fluid opens into the annular nozzle at a distance from the annular orifice. It conveys a stream of fluid through the annular nozzle and allows the annular orifice to create a fluid jet in a detection direction of the sensor and to determine pressure conditions within the pipe member depending on the fluid jet.

3 Claims, 9 Drawing Figures

PATENTED JUL 4 1972

INVENTOR.
PIER LUIGI PANIGATI

INVENTOR
PIER LUIGI PANIGATI

FLUID OPERATED SENSOR

BACKGROUND OF THE INVENTION

This invention relates to fluid operated sensors in particular pneumatic sensors adapted to detect the presence or absence of an object in their proximity.

Sensors of this type are in the form of an air jet generating nozzle directed towards the object the presence of which should be signalled.

Usually they comprise a nozzle body provided with a through bore and a pipe placed in said through bore and coaxial therewith. The pipe has an outer diameter smaller than the diameter of the bore, so that an annular duct or passage is formed between the pipe and the wall of the bore. The length of the pipe corresponds to the length of the bore. At the outlet end of the nozzle both the pipe and the bore are open. At the opposite end the pipe is fitted with a connector member for the connection with a pneumatic controlling circuit and the annular duct is closed at that end. From the annular duct branches a pressurized air input duct which opens into the annular duct at a distance from the outlet end of the nozzle near the closed end of the annular duct. This input duct extends in a direction transverse to the annular duct and is connected with a source of pressurized air. It is important to note that in such known sensors both the axes of the annular duct and the input duct lie in the same plane, i.e. the axes of these ducts intersect with each other. The pressurized air fed into the input duct creates an air jet at the outlet end of the nozzle. The pressure conditions in the pipe depend on the characteristics of the jet at the outlet end of the nozzle and when the jet strikes against an objet in front of the nozzle a variation of the pressure within the pipe occurs and is transmitted therefrom into the pneumatic control circuit as an input signal, signalling in this way the presence of the object.

A short coming of such pneumatic sensors is the short responsive distance of the sensor from the objet, at which the sensor is still capable to signal the presence of the object.

SUMMARY OF THE INVENTION

The main object of the present invention is that of conceiving a fluid operated sensor of the described type, the responsive distance of which is much longer than that of the known sensors operating with equal input pressure.

Another important object of the invention is that of conceiving a sensor of the described type whereby a positive output signal may be obtained over the entire sensing field.

Another object of the invention is that of conceiving a sensor of the described kind whereby the sign and amplitude control of the output signal can be achieved while keeping the input pressure constant and without modifying the sensing field.

These and still further objects are attained by a fluid operated sensor according to the invention, comprising, either in the input duct for pressurized fluid or in the annular duct of the nozzle, surface formations imparting an helical movement to the fluid passing through said annular duct of the nozzle thereby to obtain a whirling jet egressing from the sensor.

BRIEF DESCRIPTION OF THE DRAWINGS

Further features and advantages of the invention will better appear from a detailed description of preferred non-exclusive embodiments of a sensor device according to the invention, illustrated by way of indicative non-limiting example in the accompanying drawing in which.

DESCRIPTION OF THE PREFERRED EMBODIMENTS

Figure 1:
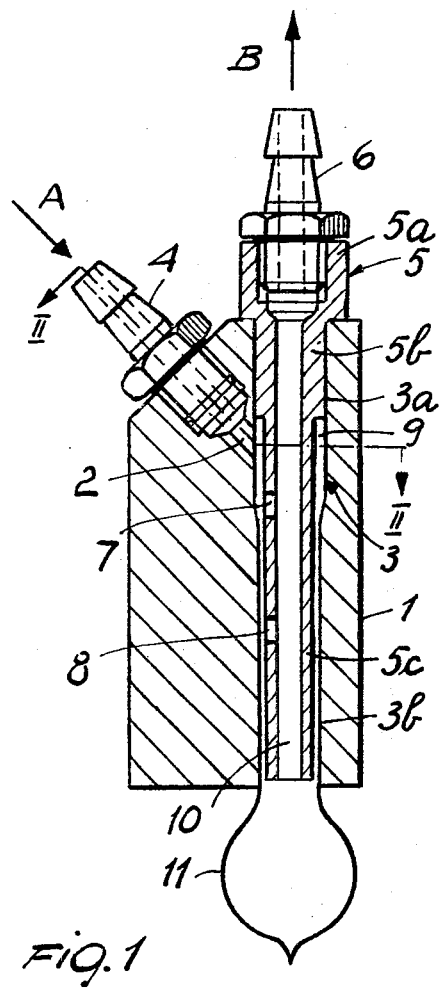
FIG. 1 is a longitudinal section view of the device according to the invention taken along lines I—I of FIG. 2.
Figure 2A:
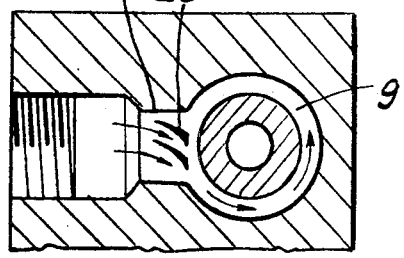
FIGS. 2a and 2b show the same sectional views as in FIG. 2, but relating to modified embodiments.
Figure 2B:
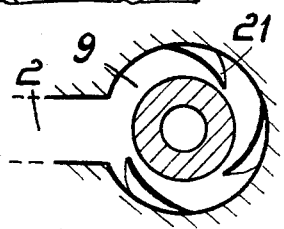
Figure 2C:
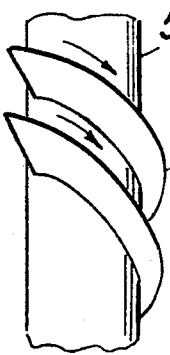
FIG. 2c shows an elevational view of a portion of a modified element.
Figure 2:
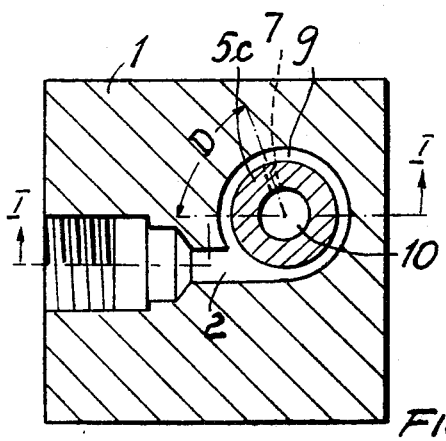
FIG. 2 is a cross-sectional view of the device taken on line II—II of FIG. 1.

With reference to FIGS. 1 and 2 the sensor according to the invention comprises a body member 1 in which two ducts 2 and 3 are formed. The ducts 2 and 3 communicate with one another, but have respective skew axes. The duct 2 is a supply duct and the duct or bore 3 houses the jet forming nozzle.

The axis of the duct 2, besides being inclined is also skew or offset with respect to the axis of the duct 3, i.e. these axes do not intersect. A portion of a union or connector 4 is screwed into a widened section of the duct 2 and connected to a pressure fluid source such as a compressed air source.

The duct 3 has a section 3a of greater diameter extending into a section 3b of smaller diameter, the latter section extending along the portion where the jet is formed.

A tubular member or pipe 5 is located in the duct 3 and comprises three portions 5a, 5b and 5c with decreasing diameters. The portion 5a having the greatest diameter is internally threaded and houses a threaded portion of a union or connector member 6 which is connected to a pneumatic control circuit.

The middle portion 5b of the tubular member 5 is slightly forced into section 3a of the duct 3, while the section 5c of smaller diameter is located with a certain amount of clearance in the section 3b and partially in the section 3a. In the latter section a greater annular gap is thus defined than that provided in section 3b. The end of the portion 5c of the pipe terminates with a slight setback relative to the edge of the body member 1 defining the annular orifice of the nozzle.

A port or bleed holes 7 is also formed in the portion 5c of the tubular member 5 near the supplying duct 2, while one or more ports or bleed holes 8 are provided near the free end of the same portion 5c. Such ports 7 and 8 communicate both with the annular gap 9 between member 1 and the tubular member 5 and the cavity 10 of the tubular member. The ports 7 and 8 may be aligned or offset to one another and with respect to the input 2 according to any arrangement but is preferable to select a pattern as will be described later. Furthermore they can be reduced in number to a single port or increased to be 3 in number or more.

An air jet 11 which is obtained when the device is operating, is diagrammatically shown in FIG. 1. For a better understanding FIG. 4 shows the same air jet 11 in order to make an easier comparison with the jet 12 which is diagrammatically shown in FIG. 3 and obtained by a sensor of known type. In such known sensor as set forth above, the ducts 2 and 3 have their axes laying in the same plane, while in the relative tubular member no ports are formed. As may be seen the boundary defining the jet of this invention is not only greater in length but also in width, with respect to the known jet.

The helical or whirling flow of the jet may also be obtained with the axis of the input duct 2 and the axis of the annular duct 9 arranged in the same plane, i.e. intersecting each other, when baffle means are placed in one of these ducts and capable to confer a whirling or helical motion to the flowing stream of gas. These baffle means may be in the form of baffles 20 (FIG. 2a), which are arranged at the entrance of input duct 2 or in the form of helical fins 21 and 22, which are arranged within the annular duct 9, the fins 21 being rigid with the wall of bore 3, while fins 22 are fixed on pipe section 5c.

Figures 5, 6:
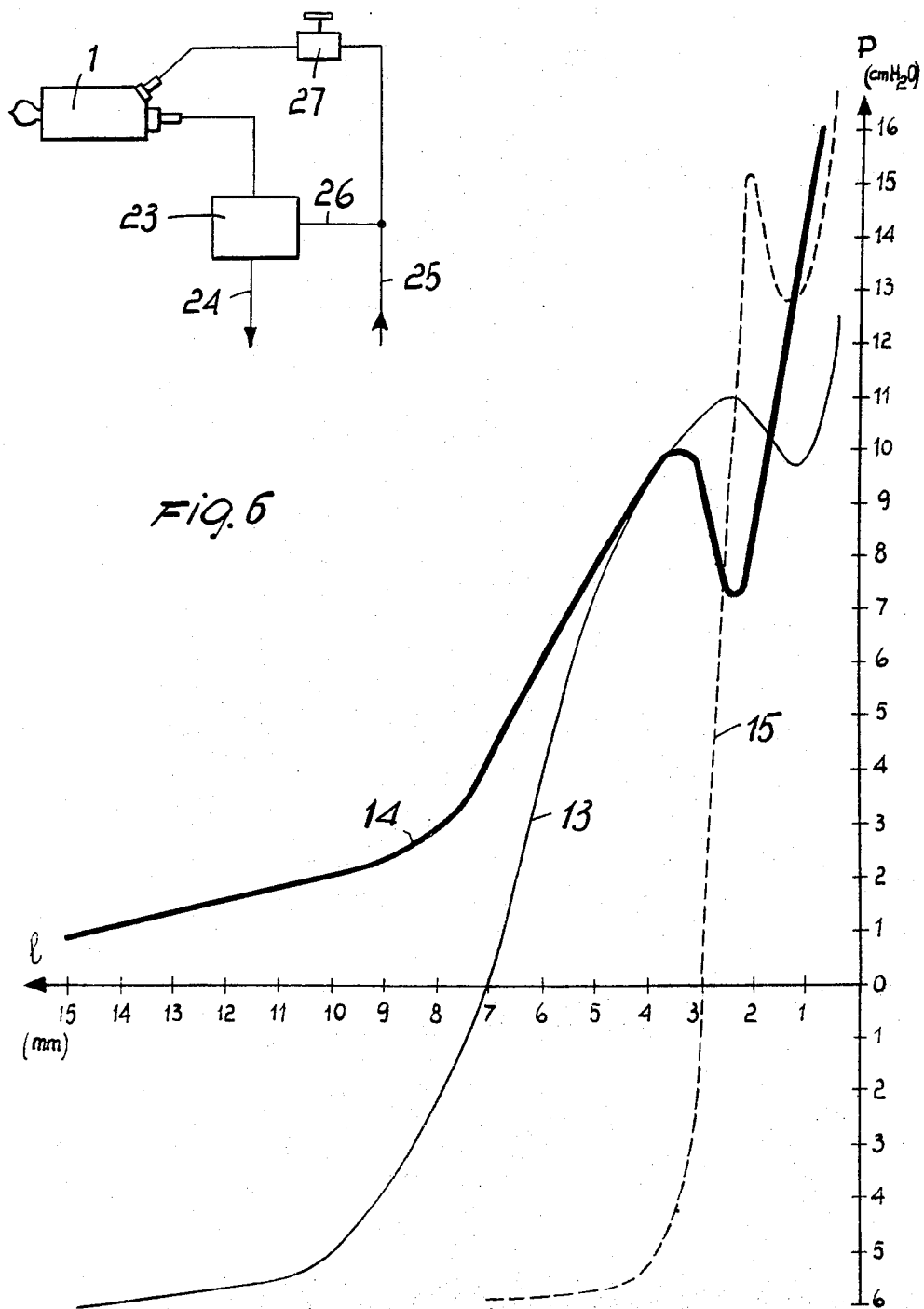
FIG. 5 shows a few operational diagrams.
FIG. 6 shows a portion of a pneumatic control circuit to which the sensor is applied.

Some operational characteristic curves are shown in FIG. 5 where the distance $l$ in mm. is measured from the orifice of the nozzle to an object against which the jet strikes and plotted in abscissae and the output pressure P at the connector 6 is measured in water centimeters and plotted in the ordinates.

More precisely two characteristic curves 13 or 14 are plotted which are obtained when supplying compressed air of about 10 p.s.i. at A (FIG. 1) to the device measuring the pressure at the output B. The first characteristic curve 13 relates to a sensor without ports 7 and 8 in the tubular member 5. The other characteristic curve 14 relates to a device in which the tubular member 5 is provided with ports 7 and 8 arranged in an angular position with respect to the input duct 2 as shown in FIG. 2, where angle D is preferably in the range from 70° to 90°.

Figure 3:
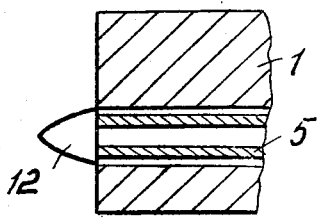
FIGS. 3 and 4 show the jet shapes for comparison purposes in a known device and a device according to the invention, respectively.
Figure 4:
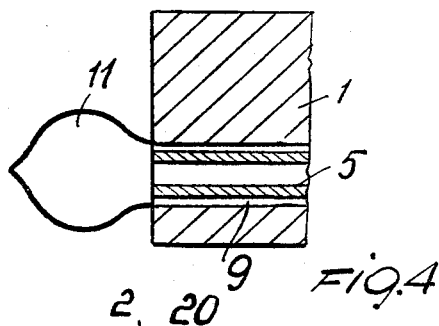

The characteristic curve 15 shown in FIG. 5 relates to a known device forming a jet as indicated at 12 in FIG. 3 and with which no helical movement is conferred to the jet.

The tubular element 5 can be rotated around the respective axis so as to change the angular position of the ports or bleed holes 7 and 8 with respect to the supply duct 2. Since portion 5b is slightly forced into the section 3a of the port 3, the adjusting may be effected by manually rotating the tubular member 5, after which the reached position is friction maintained possibly by means of a detent.

In angular positions beyond the above indicated range of angle D (FIG. 2) intermediate curves between curve 13 and curve 14 are obtained.

The sensor of the described type may be connected to pneumatic control systems of various types. As an example one of such circuits is schematically shown in FIG. 6, where the sensor 1 is connected to an interface valve 23 of known type provided with a diaphragm and through which the pressure signal received from sensor 1 is converted into a control pressure capable of actuating a control device connected with the output 24 of the interface valve 23. The operative pressure of about 6 – 12 atmospheres is supplied through pipe 25 and 26 to the interface valve and through pressure reducing valve 27 to the sensor 1. The interface valve 23 may be connected to a known converter of pneumatic signals into electric pulse for operating a suitable electrically operated control system.

The operation of the sensor according to the invention is as follows.

Since the axis of duct 2 is skew and offset with respect to the axis of the annular duct 9, compressed air fed through duct 2 receives a whirling motion when reaching annular duct 9, which results in a greater length and width of the air jet 11 outside the sensor and thus in a greater sensitive distance than in the known devices. As stated, the so-provided arrangement causes the air passing through the gap 9 to flow in a substantial helical movement.

The arrangement of the axes of the ducts 2 and 3 offset to one another permits a characteristic curve 13 (FIG. 5) to be obtained providing a sensitive distance much greater than that of a characteristic curve 15 of a device of known type.

It was found, for example, that in a sensor according to the invention an output signal may be obtained of 1 cm. ($H_2O$) , when a surface or an article is located at a distance of about 7 mm. from the device. By comparison, a device of the known type gives an output signal of equal amplitude (1 cm. $H_2O$), when an article or a surface is located at a distance of 3 cms. from the sensor (see curves 13 and 15 in FIG. 5).

It should be noted that the curves in FIG. 5 have been obtained by gradually approaching a surface or an article to the device from a remote position at which no influence is exerted on the output. The output signal B will vary correspondingly from negative (depressions) to positive values.

When the tubular member 5 is provided with one or more ports 7, 8, some amount of supplied air is directly caused to return to the output B thus obtaining a certain bias or polarization. By suitably rotating the tubular member 5 around its own axis, a positive signal may be obtained at the output B throughout the engaging field, as shown by the curve 14 in FIG. 5.

The advantage of having a positive output signal in all the sensitive field result in a better operation, in a higher simplicity and avoidance of undesired operation of the controlled members in the detecting device.

The possibility of varying the position of the ports 7 and 8 by rotating the tubular member 5 permits the supplied air to be conveyed to the output B to be adjusted. A mass production of sensors having the same characteristic curves (which otherwise would be different for inevitable manufacturing inaccuracies) may be brought about. Moreover it is possible to manufacture a sensor having a characteristic curve with a shape similar to that indicated in 14 in FIG. 5 and with the possibility to adjust the sensor so that its characteristic curve, while maintaining substantially its shape is positioned vertically translated between two end positions corresponding to the conditions of maximum or minimum output.

As may be noted the sensors according to the invention have remarkable advantages with respect to the known devices, and may be manufactured at a very low cost.

Particularly important is the increase of the sensitive distance, as may be realized by comparing the characteristic curves 13 or 15 in FIG. 5 and FIGS. 3 and 4.

The invention thus conceived is susceptible to numerous modifications and changes all of which should be considered as included in the scope of the inventive idea.

Thus for example ports 7 and 8 may be omitted or they could be provided in any position and with different diameters.

In practice all the used materials as well as dimensions could be selected at will according to the requirements.

I claim:

1. A fluid operated sensor comprising a pipe member having one end open and an opposite end thereof connected to a fluid operated control circuit, an annular nozzle surrounding at least a portion of said pipe member and having an annular orifice surrounding said open end of said pipe member, at least one pressure fluid input duct connected with a source of pressurized fluid and opening into said annular nozzle at a distance from said annular orifice, thereby to convey a stream of fluid through said annular nozzle and to allow said annular orifice to create a fluid jet in a detection direction of the sensor and to determine pressure conditions within said pipe member depending on said fluid jet, at least one among said input duct and said annular nozzle having surface means imparting a helical movement to said stream of fluid passing through said annular nozzle, thereby to obtain a jet outgoing from said annular orifice, with a rotary movement component, said pipe member having at least one radial bleed hole in a portion thereof surrounded by said annular nozzle, wherein according to the improvement, said pipe member has supporting means allowing rotation thereof about its axis thereby to adjust the angular position of said radial bleed hole with respect to said annular nozzle.

2. A fluid operated sensor comprising a pipe member having one end open and an opposite end thereof connected to a fluid operated control circuit, an annular nozzle surrounding at least a portion of said pipe member and having an annular orifice surrounding said open end of said pipe member, at least one pressure fluid input duct connected with a source of pressurized fluid and opening into said annular nozzle at a distance from said annular orifice, thereby to convey a stream of fluid through said annular nozzle and to allow said annular orifice to create a fluid jet in a detection direction of the sensor and to determine pressure conditions within said pipe member depending on said fluid jet, at least one among said input duct and said annular nozzle having surface means imparting a helical movement to said stream of fluid passing through said annular nozzle, thereby to obtain a jet outgoing from said annular orifice, with a rotary movement component, and wherein according to the improvement said surface means comprise baffles located at the connection of said input duct with said annular nozzle, said baffles directing the fluid stream in a direction tangential to said annular nozzle.

3. A fluid operated sensor comprising a pipe member having one end open and an opposite end thereof connected to a fluid operated control circuit, an annular nozzle surrounding at least a portion of said pipe member and having an annular orifice surrounding said open end of said pipe member, at least one pressure fluid input duct connected with a source of pressurized fluid and opening into said annular nozzle at a distance from said annular orifice, thereby to convey a stream of fluid through said annular nozzle and to allow said annular orifice to create a fluid jet in a detection direction of the sensor and to determine pressure conditions within said pipe member depending on said fluid jet, at least one among said input duct and said annular nozzle having surface means imparting a helical movement to said stream of fluid passing through said annular nozzle, thereby to obtain a jet outgoing from said annular orifice, with a rotatory movement component and wherein according to the improvement said surface means comprise fins within said annular nozzle and imparting a helical movement to the stream passing through said annular nozzle.

* * * * *

Notice of Adverse Decision in Interference

In Interference No. 98,103 involving Patent No. 3,673,856, P. L. Panigati, FLUID OPERATED SENSOR, final judgment adverse to the patentee was rendered July 30, 1974, as to claims 1–12 and 14–16.

[*Official Gazette November 12, 1974.*]